3,401,233
FOCUSING IN OPTICAL SYSTEMS
Geoffrey M. Hellings, Aylesbury, England, assignor to Redifon Air Trainers Limited
Filed Nov. 27, 1964, Ser. No. 414,312
Claims priority, application Great Britain, Dec. 13, 1963, 49,396/63
1 Claim. (Cl. 178—7.85)

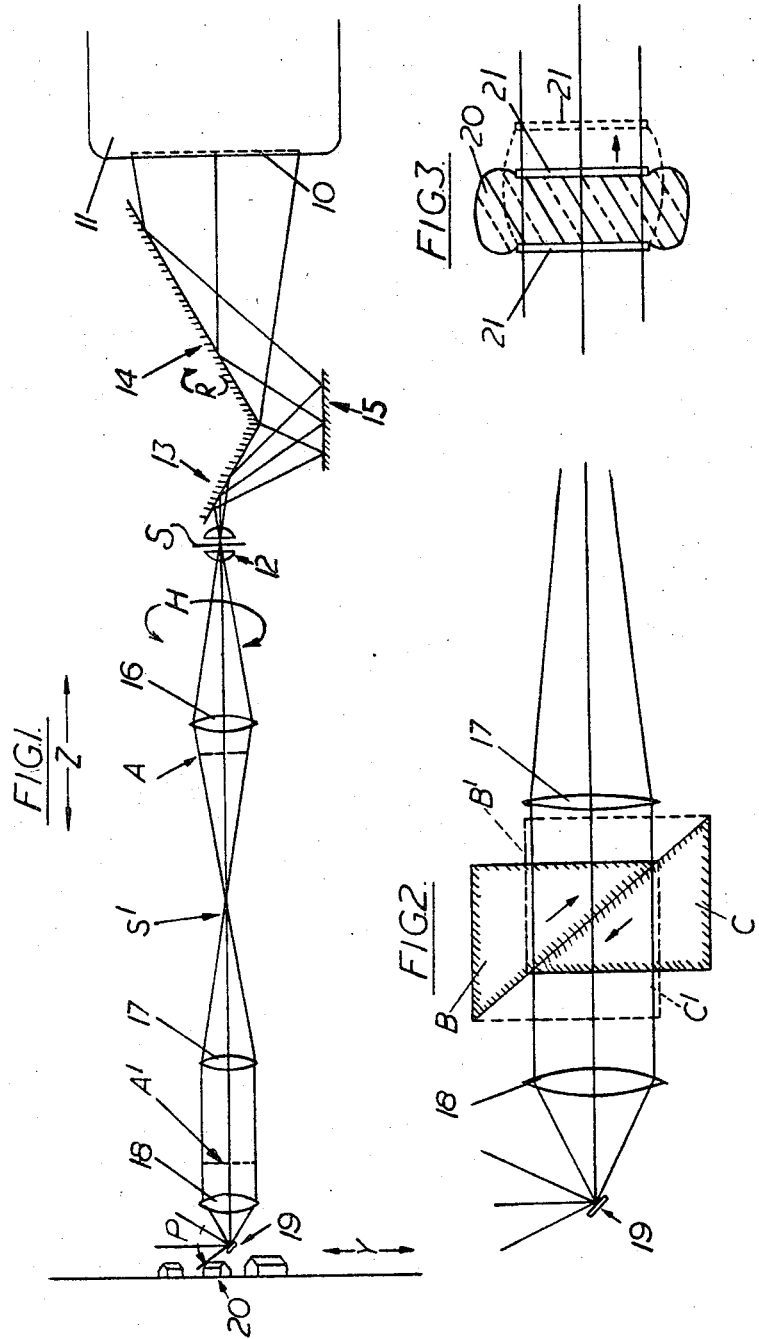

ABSTRACT OF THE DISCLOSURE

An optical system for viewing a terrain model with a television camera with improved focusing including a tiltable mirror adapted to reflect light from the model to a collimating lens system having first and second positive field lenses and an image rotator for rotating the image applied to the television camera, with a pair of movable wedges situated between the field lenses for focusing the system.

---

This invention relates to optical systems for forming images of external scenes in a specified plane such as that of the photosensitive receptor surface of a photographic or television camera, and has particular reference to provision for focusing, that is to say for progressively adjusting the system in respect of the viewed object distance which corresponds to the sharpest picture at the image plane. This normally involves changing the spatial relationship between system lenses (or mirrors) and the image plane. As will be later explained, there can be circumstances in which this is inconvenient, and the invention provides focusing means which avoids it.

According to the invention there is interposed in the light path through the system a block or cell of transparent material which has plane boundary surfaces parallel to each other and transverse to the optic axis of the system, and which is adjustable as to its thickness, that is to say its dimension along that axis is variable. It can be shown that this will vary an optical parameter of the system in a way which can produce the desired effect.

The invention can be particularly useful in its application to television camera assemblies which are moved over scale model terrain areas in response to a trainee's handling of the controls of a device such as an aircraft flight simulator, the picture so obtained being ultimately projected on a screen in front of him. It will therefore for convenience be more fully described as embodied in the optical system of such a camera, although it will be evident that it has other applications.

Of the accompanying drawings:

FIGURE 1 is a diagram showing the optical layout of the complete system.

FIGURE 2 is an enlargement of part of FIGURE 1 illustrating the incorporation of one form of variable-thickness cell according to the invention, and FIGURE 3 illustrates an alternative form of cell.

In these drawings, the only light rays indicated are the axial and marginal principal rays. Image planes are shown, but this system is stopped down to so small an aperture that the principal rays (that is to say the central rays of the bundles going to the respective points in the image) are sufficient to show the light paths through the system for the present purpose.

Referring to FIGURE 1, the photocathode 10 of an image-orthicon television camera tube 11 has formed on it the real image of an external scene by a camera lens 12 having a very small stop S at its node. Interposed between this lens and the final image is an image rotator comprising three reflecting surfaces 13, 14, 15 maintained mutually fixed in the K-form relationship shown but rotatable as an assembly about the optic axis of the system, as indicated by the arrow R. Whilst these three reflectors are indicated in FIGURE 1 as front-silvered mirrors, the unit could of course be made in solid form from two truncated glass prisms cemented together; or indeed the image rotator could be a conventional Dove prism, provided that the conical divergence of the principal rays through it is not sufficient to cause objectionable anomalies in the final image.

Forward of the camera lens 12 is a field lens 16 which in effect brings the stop S forward to node position S', and forward of this position are two field lenses 17 and 18 which bring the system stop forward again to fall upon a small pick-up mirror 19 set at 45° to the optic axis of the system. This mirror accordingly carries the entrance pupil or viewpoint of the system, from which it looks upwards along a vertically-hung terrain model 20 having countryside features, airport runway and buildings and the like, modelled in full three-dimensional detail to a scale of the order of 1/2000 full size.

In the practical application of this system, the picture received by the tube 11 is processed by closed-circuit television equipment which finally projetcs it on to a viewing screen placed in front of the pilot's cabin of an "indoor" aircraft trainer or flight simulator device. The pilot of this is thereby given the view he would have were his eye at the position of mirror 19 relatively to the model 20, and arrangements are made for his handling of the simulator controls to vary this position progressively in accordance with the progress of the simulated flight he is making. In particular, the model 20 is moved in the direction of arrow Y and the entire camera assembly is mounted in a carriage moving in an X direction at right angles to the plane of the figure: these motions in combination provide for the changing plan position of the supported aircraft. In addition, the mounting of the camera assembly is also such as to provide for its motion in the Z-direction shown to vary the height of the pilot's viewpoint in accordance with climb and descent of the supposed aircraft.

The smallness of the model scale is necessary to simulate an area of terrain adequate for aircraft operation, but it involves at times a closeness of approach of the entrance pupil at 19 to the model which imposes a severe depth of field requirement on the equipment if the scene is to be realistic in appearance. For this reason the stop S may be so small that the system has an effective aperture of $f/70$: even so, provision for focus adjustment linked to altitude is desirable over the final part of a landing descent, and the system must be such as to permit this to be arranged.

Changes of aircraft attitude will be simulated by adjustments in the camera optical system itself. Operation of the image rotator 13, 14, 15 will evidently simulate rolling or banking. Rocking of the viewpoint mirror 19 in the sense indicated by arrow P will give the visual effect of pitching. Rotation of the complete optical assembly as indicated by arrow H will cause the "direction of looking" of the system to sweep round in a plane at right angles to that of the drawing and so will simulate heading changes. Unless the camera tube 11 is made to share this last rotation (which usually would be inconvenient and undesirable) there will be a spurious banking of the image, and this will be offset by an additional function applied to the image rotator.

In the optical system the axial relationships of lens 17, photocathode 10, and all the elements between them are fixed, and the arrangement is such that—

(a) The sharpest picture on photocathode 10 is that derived from a real image in plane A relatively closely in front of lens 16.

(b) The intermediate position S' of the system stop is effectively at the rear principal focus of lens 17.

Feature *a* provides a space between S' and A where additional or superposed visual effects can conveniently be introduced and made to seem anywhere between the viewer's eye and infinity, or moved progressively between these limits without hindrance. An example of this is the device referred to in copending application No. 11375/61, in which a small illuminated screen is moved in the simulation of sky and mist, the apparent sharpness of its lower edge varying with its axial distance from a pupil or eyepoint in the system. Had this device to be associated with the front eyepoint 19 it would form with its supporting and operating mechanism a considerable encumbrance, and could not in practice be moved out as far towards infinity as is often required.

Provision *b* will means that the principal rays of the system will run mutually parallel between lenses 17 and 18 and that the entrance pupil on mirror 19 will be at the front principal focus of lens 18. The sharpest real image at A is produced by lens 17 from a real image A' at a fixed distance in front of it; this image is in turn formed by lens 18, and whether it corresponds (when at A') to near or far features of the scene can be determined by varying the effective separation of the nose assembly 18, 19 from lens 17. This variation is therefore the focusing adjustment of the system, and the parallel disposition of the principal rays between lenses 17 and 18 ensures that, unlike conventional camera optics, focus alteration does not involve change in effective magnification and field of view. These would produce variably distorted perspective in the picture as finally viewed, which would be undesirable in a device for training aircraft pilots.

This focusing must not however be done by moving the nose assembly 18, 19 in the direction relatively to the model 20, since this would also produce the visual effect of an unintended and unaccountable change in aircraft height above ground. Because of this, the entire camera assembly must (in the absence of any alternative) be given shifts equal and opposite to the telscopic focusing adjustments made in the optical system. Not only does this complicate the camera control system and impose an undesirable mass loading on the focus mechanism; there are applications (for example in the simulation of surface vehicle and ship operation) in which provision for Z motion of the camera is not otherwise needed at all. Also, the physical telescoping of the structure of the system can undesirably complicate operating connections to the nose assembly for pitching the mirror 19 and other purposes. These drawbacks are avoided by the focusing device according to the invention, of which an example is illustrated by FIGURE 2.

This consists essentially of two glass wedges B and C placed as shown between lenses 17 and 18 to form a parallel-faced solid glass cell whose effective thickness can be adjusted by sliding the wedges oppositely as indicated by the arrows. Appropriate supporting and guiding mechanism to permit this may readily be devised; preferably it will maintain the two "hypotenuse" faces separated by a film of air rather than allowing them to rub against each other.

It can be shown that if $t$ is the physical thickness of the cell, the latter is the optical equivalent of a thickness $t/\mu$ of air, i.e. of two thirds of $t$ for $\mu=1.5$. In other words, changing to glass a given thickness of air $t$ in the fixed space between lenses 17 and 18 will reduce their effective optical separation by one-third of $t$. FIGURE 2 relates to an arrangement in which lens 18 has a focal length of 8 mm. and an effective diameter of 9 mm., giving the system nearly a 60° field of view from mirror 19, itself at 8 mm. in front of the lens. Adjustment of the double wedge from its minimum thickness of 6 mm. (B, C) to its maximum of 12 mm. (B', C') introduces an additional thickness of 6 mm. of glass in place of air and will therefore change the optical spacing between lenses 17 and 18 by 2 mm. This is the separation between the image planes, behind lens 18, which correspond respectively to object distances of infinity and 40 mm. in front of the lens 18; this latter distance is 32 mm. in front of the viewpoint 19, which represents 70 yds. at the model scale of 1/2000. By use of the wedges, therefore, the system can be focused over this very wide range without physical alteration of its length.

It will be appreciated that the particular system shown in FIGURES 1 and 2 of the drawings and described above is an example only, and also that the focusing cell can be provided in other ways. For example, as indicated in FIGURE 3, it could be an expansible cell 20 having end plates in the form of thin glass discs 21, 22 movable towards and away from each other, the interior of the cell being full of a transparent liquid such as a stable mineral oil. Such a cell could provide for a large variation of its thickness without involving the transverse dimensions which would be required by the equivalent double wedge, and this could in some applications be important.

I claim:

1. A television pick-up system for viewing a terrain model, comprising, in combination: a television camera having a photosensitive surface; a lens system having an external entrance pupil for forming an image of said terrain model on said photosensitive surface; a tiltable mirror having a reflecting surface situated at said external entrance pupil for reflecting light from said model to said lens system, said lens system comprising a first positive field lens having its front principal focal point located at said entrance pupil, a second positive field lens spaced at a fixed distance along an optical axis from said first field lens, further lens and optical stop means fixedly disposed along said optical axis for applying rays from said second positive field lens to said photosensitive surface of said television camera, said photosensitive surface being situated at a fixed distance along said optical axis from said second field lens, image rotator means along said optical axis between said further lens means and said photosensitive surface for rotating images applied to said photosensitive surface about said optical axis, and a variable optical thickness device situated between said first and second field lenses, said variable optical thickness device comprising oppositely disposed optical wedges and having a pair of external surfaces both perpendicular to said optical axis and a pair of internal surfaces parallel to each other and inclined relative to said optical axis, said wedges being moveable relative to each other along said internal surfaces for varying the focus of said lens system.

References Cited

UNITED STATES PATENTS

| | | | |
|---|---|---|---|
| 2,258,903 | 10/1941 | Mitchell | 350—204 |
| 2,672,786 | 3/1954 | Capstaff | 350—286 |
| 2,700,918 | 2/1955 | Osterberg et al. | 350—13 |
| 2,719,457 | 10/1955 | Tripp | 350—26 |
| 3,039,360 | 6/1962 | Hopkins | 350—206 |

DAVID SCHONBERG, *Primary Examiner.*

DAVID H. RUBIN, *Examiner.*

R. J. STERN, *Assistant Examiner.*